US005962090A

United States Patent [19]

Trautz

[11] Patent Number: 5,962,090

[45] Date of Patent: Oct. 5, 1999

[54] SPACER FOR AN INSULATING GLAZING ASSEMBLY

[75] Inventor: Hans Trautz, Pforzheim, Germany

[73] Assignee: Saint-Gobain Vitrage Suisse AG, Bern, Switzerland

[21] Appl. No.: 08/822,649

[22] Filed: Mar. 24, 1997

Related U.S. Application Data

[63] Continuation-in-part of application No. 08/642,617, May 3, 1996, abandoned.

[30] Foreign Application Priority Data

Sep. 12, 1995 [DE] Germany ........................... 195 33 685

[51] Int. Cl.$^{6}$ ................................ B29D 22/00; E06B 3/24

[52] U.S. Cl. .......................... 428/34; 428/35.8; 428/36.3; 52/786.13

[58] Field of Search ............................ 428/34, 192, 35.8, 428/36.3, 36.6; 52/786.13, 786.1

[56] References Cited

U.S. PATENT DOCUMENTS

| | | | |
|---|---|---|---|
| 5,079,054 | 1/1992 | Davies | 428/34 |
| 5,460,862 | 10/1995 | Roller | 428/34 |

*Primary Examiner*—Donald Loney
*Attorney, Agent, or Firm*—Walter Ottesen

[57] ABSTRACT

The invention relates to a spacer for an insulating glazing assembly. The spacer has two mutually parallel extending contact surfaces for the respective glass panes and an adhesion surface facing away from the interior space between the glass panes. The adhesion surface connects the two contact surfaces. The spacer includes a metal layer disposed on the adhesion surface. The metal layer is cemented to the adhesion surface, and the amount of short-fibred glass-fibers in the plastic is selected such that the coefficient of thermal expansion of the base body is adapted to the thermal expansion of the metal-layer.

14 Claims, 1 Drawing Sheet

SPACER FOR AN INSULATING GLAZING ASSEMBLY

RELATED APPLICATION

This is a continuation-in-part of U.S. patent application Ser. No. 08/642,617, filed May 3, 1996 now abandoned.

FIELD OF THE INVENTION

The invention relates to a spacer for an insulating glazing assembly which includes at least two mutually adjacent glass panes conjointly defining an interior space therebetween. The spacer is disposed between the panes of glass and includes a base body made of glass-fiber reinforced plastic having two mutually parallel contact surfaces on opposite sides thereof in contact engagement with corresponding ones of the glass panes. The base body also defines an adhesion surface facing away from the interior space and extends between the two glass panes. A metal layer is disposed on the adhesion surface.

BACKGROUND OF THE INVENTION

Such a spacer is known from the European Patent No 0,127,739. The metal layer is coextruded with the base body which, with great variations of the temperature, gives only a poor adhesion of the metal layer. This is important if, in difference to the spacer according to this European patent, an insulating and sealing mass is applied on the free part of the spacer, e.g. around the metal layer, which should adhere on the metal layer as well as on the glass panes, for having a good and durable stability.

Insulating glazing assemblies and the spacer of the kind referred to above are known. The spacers are especially utilized for double-plane insulating glass in order to provide a spaced connection of the two individual glass panes. The glass panes and spacer conjointly define an interior space and the spacer seals this interior space from the ambient so that, for example, a gas introduced into the space cannot escape. Furthermore, and with an appropriate configuration, the spacer is intended to prevent moisture or air from the ambient from penetrating the interior space which otherwise would cause the glass panes to become opaque over a longer period of time.

However, the spacers present the disadvantage that they exhibit a higher thermal conductivity compared to the gas disposed in the interior space. This gas can, for example, be air. Because of this condition, the glass pane facing inwardly cools down sharply in the immediate region of the spacer when outside temperatures are low. A consequence of this condition is that unwanted moisture condenses at these locations.

An improvement of the insulating characteristics of the spacers can be obtained utilizing plastic material. However, this presented the problem that the adhesive and sealing mass introduced between the edges of the two glass panes bonded poorly to the plastic. The adhesive and sealing mass is usually polysulfide or silicone. Because of this situation, leakage between the interior space and the ambient as well as hollow spaces between the spacer and sealing mass occurred. In these hollow spaces, moisture could collect and further deteriorate the seal.

It is further known, for example from the U.S. Pat. No. 5,260,112, to reinforce the strength of plastic by the use of glass-fibers or mineral powders.

SUMMARY OF THE INVENTION

In view of the above, it is an object of the invention to provide a spacer for an insulating glazing assembly which, having a low thermal conductivity, provides a reliable adhesive bond and seal and wherein the metal layer is cemented reliably to the plastic base body.

This object is attained with a spacer wherein the metal layer is cemented to the adhesion surface, and the amount of short-fibred glass fibers in the plastic is chosen such that the coefficient of thermal expansion of the base body is adapted to the one of the metal-layer.

According to another feature of the invention, the metal foil is made of aluminum and cemented on the outer surface of the spacer using a non-gassing adhesive, that is, an adhesive in which gases do not evolve.

BRIEF DESCRIPTION OF THE DRAWINGS

The invention will now be described with respect to the drawings wherein.

DESCRIPTION OF THE PREFERRED EMBODIMENTS OF THE INVENTION

Figure 1:
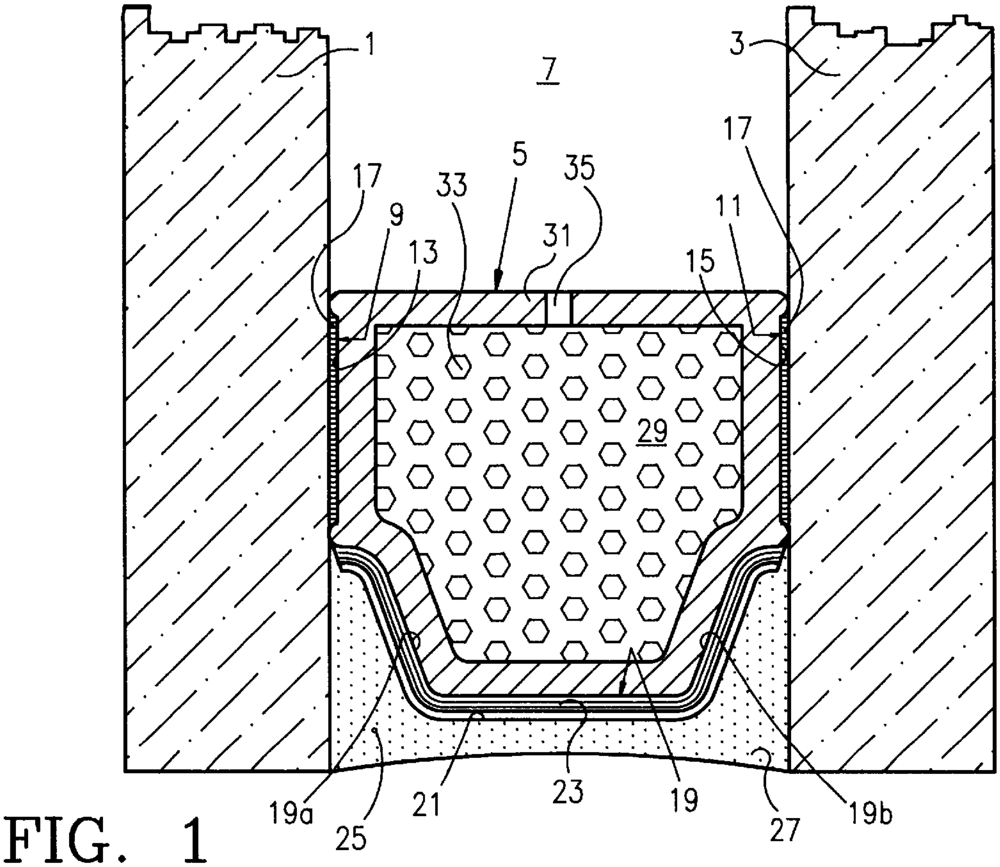
FIG. 1 is a section view through the edge region of an insulated glazing assembly incorporating the spacer according to the invention.

A detail view of a portion of a preferred embodiment of the spacer and insulating glazing assembly is shown in FIG. 1 wherein the glass panes are identified by reference numerals 1 and 3. The glass panes 1 and 3 are mutually parallel and are arranged in a spaced relationship to each other by means of a spacer 5. This spacer 5 extends along the peripheral edge of the two glass panes 1 and 3 so that an interior space 7 is delimited by the two glass panes and the spacer 5. This interior space 7 is usually filled with air or other gas.

The spacer 5 includes a base body 31 which has contact surfaces 9 and 11 which face toward glass panes 1 and 3, respectively. The contact surfaces 9 and 11 have groove-like recesses 13 and 15, respectively, formed therein into which a plastic sealing mass is introduced. The sealing mass can, for example, be a butyl compound such as butyl rubber. The recesses 13 and 15 ensure a minimum contact surface or thickness of butyl rubber on the glass panes.

A surface 19 facing outwardly extends from the contact surface 9 to the contact surface 11. This surface 19 is referred to in the following as the adhesion surface. This adhesion surface 19 has an essentially U-shaped cross section. The two legs 19*a* and 19*b* of this cross section extend outwardly away from each other.

A metal foil 21 such as an aluminum foil is applied to this adhesion surface 19. The bond is provided with the aid of a non-gassing adhesive 23, for example, a PUR-hotmelt adhesive curing with humidity. If a conventional adhesive would be used, gases would diffuse through the spacer into the interior space 7 and, in the worst case, lead to a condensate on the glass pane.

It is also possible to obtain a good and durable adhesion of the metal layer to the base body 31 by vapor deposition, whereby other metals as aluminum or steel can be used.

For obtaining a good and durable bond of the metal foil 21 or metal layer to the plastic body 31 the difference of the temperature expansion coefficient of both parts should be as small as possible, otherwise causing a chipping off of the foil 21 or layer. To this end, and for obtaining an as good as possible adjustment of both thermal expansion coefficients as good as possible, an appropriate amount of short glass fibers are admixed to the plastic of the body 31. It is evident that according to the foil selected, e.g. aluminum or steel, a smaller or greater amount of glass fibers are admixed, preferentially already to the plastic granulate. Furthermore, the amount admixed refers also to the plastic material selected. However, in lieu of glass fibers, other reinforcing means such as mineral powders can be used.

It is advantageous to utilize a thermoplastic plastic material for enabling a good processing, for example a plastic known under the trademark LURAN from BASF, Germany, this plastic being a SAN-plastic comprising glass fibers. With the use of such a plastic material and an aluminum foil the glass fibers amount is about 35%.

An adhesive or sealing mass 27 is introduced into the space 25 conjointly defined by the two glass panes 1 and 3 and the metal foil 21. On the one hand, this cements the two glass panes to the spacer and, on the other hand, effects a further sealing of the interior space 7. The adhesive or sealing mass 27 is preferably polysulfide or silicone.

This sealing mass 27 does not come into direct contact with the plastic of the spacer because the adhesion surface 19 is covered outwardly by the metal foil 21. Instead, the sealing mass 27 is in contact with the metal foil 21. The adhesion of polysulfide or silicone to metal is significantly greater than to plastic. For this reason, an improved adhesive bond of the individual parts is obtained. Furthermore, the sealing mass 27 does not separate from the foil 21 so that the formation of hollow spaces is prevented.

The base body 31 of the spacer 5 defines a hollow space 29. Viewed in cross section, the hollow space 29 and base body 31 are enclosed by the two contact surfaces 9 and 11 and the adhesion surface 19 is shown. The top portion of the wall of base body 31 faces toward the interior space 7. This configuration enhances further the stability of the spacer. Preferably, a desiccant 33, for example silica-gel, molecular sieves or a mix of both means is introduced into the hollow space 29 which draws moisture/water vapor from the interior space 7. A connection between the interior space 7 and the hollow space 29 is provided by a plurality of breakthroughs 35 in the wall of the base body 31.

The spacer 5 extends in the longitudinal direction and is bent at an angle of 90° at the corners of the two mutually adjacent glass panes (not shown in the Figures). This is possible since the base body is made of thermoplastic material. This permits either a corner connection to be used or to bend a corner.

Figure 2:
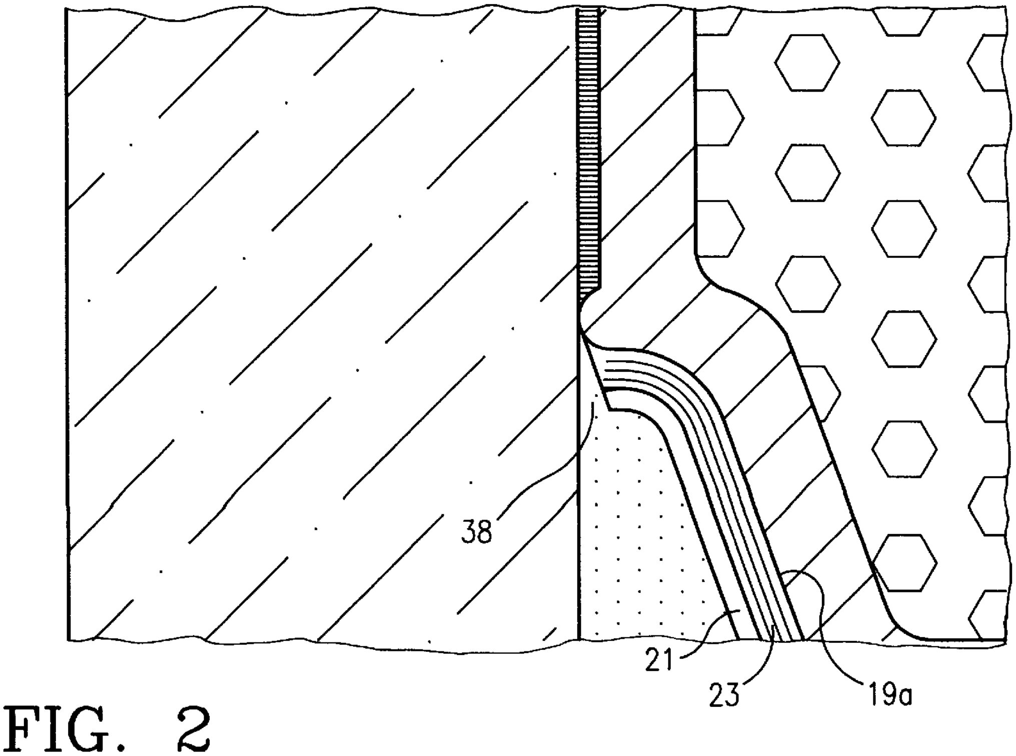
FIG. 2 is an enlarged detail view showing the gap between one edge of the aluminum foil and a glass pane to reduce the transmission of heat or cold of the metal foil to the glass pane.

FIG. 1 shows further that the longitudinally extending edges of the metal foil 21 are not in contact with the respective glass panes 1 and 3. In this way, and as shown in FIG. 2, an insulating gap 38 is defined between the panes and the good heat conducting metal foil 21. The gap 38 is filled with the sealing mass 27. In addition, the transmission of heat or cold of the metal foil 21 is reduced in that the thickness of the metal foil is selected to be less than 0.1 mm, and in that the path between the two glass panes 1 and 3 is increased by the U-shaped or V-shaped configuration of the adhesion surface 19. Other forms are also conceivable.

It is understood that the foregoing description is that of the preferred embodiments of the invention and that various changes and modifications may be made thereto without departing from the spirit and scope of the invention as defined in the appended claims.

What is claimed is:

1. A spacer for an insulating glazing assembly which includes at least two mutually adjacent glass panes conjointly defining an interior space therebetween, the spacer being disposed between said glass panes and the spacer comprising:

a base body made of plastic and having two mutually parallel contact surfaces on opposite sides thereof in contact engagement with corresponding ones of said glass panes;

said base body being reinforced by glass fibers distributed in said plastic;

said base body also defining an adhesion surface facing away from said interior space and extending between said two glass panes;

a metal layer cemented to said adhesion surface; and said glass fibers being selected in amount such that the coefficient of thermal expansion of said base body corresponds substantially to the thermal expansion of said metal layer.

2. The spacer of claim 1, wherein said metal layer is a metal foil, said metal foil being bonded by a non-gassing adhesive curing with humidity to said base body.

3. The spacer of claim 1, wherein said base body is defined by an annular wall enclosing a hollow space.

4. The spacer of claim 1, wherein said adhesion surface has essentially a U-shaped configuration when viewed in cross section.

5. The spacer of claim 2, wherein said metal foil is made of aluminum.

6. The spacer of claim 1, wherein said base body is made of a thermoplastic plastic.

7. The spacer of claim 6, wherein said thermoplastic plastic is a SAN-plastic.

8. The spacer of claim 1, said base body being defined by an annular wall enclosing a hollow space; a portion of said annular wall facing toward said interior space; and, said portion of said annular wall having a plurality of breakthroughs formed therein interconnecting said interior space and said hollow space.

9. The spacer of claim 3, further comprising a desiccant disposed in said hollow space.

10. The spacer of claim 1, said metal layer having first and second longitudinally extending edges adjacent respective ones of said glass panes; and, each of said edges and the glass pane adjacent thereto conjointly defining a longitudinally extending gap therebetween thereby reducing a transfer of heat or cold between said glass panes via said metal foil.

11. The spacer of claim 10, said metal layer and said glass panes conjointly defining a recess extending peripherally around said glazing assembly; and, said spacer further comprising a sealing mass filling said recess and penetrating into each of the gaps between said metal foil and said glass panes.

12. A spacer for an insulating glazing assembly which includes at least two mutually adjacent glass panes conjointly defining an interior space therebetween, the spacer being disposed between said glass panes and said spacer comprising:

a base body made of plastic having two mutually parallel contact surfaces on opposite sides thereof in contact engagement with corresponding ones of said glass panes;

said base body being reinforced by glass fibers distributed in said plastic;

said base body defining an adhesion surface facing away from said interior space and extending between said two glass panes;

a vapor-deposited metal layer disposed on said adhesion surface; and, said glass fibers being selected in amount such that the coefficient of thermal expansion of said base body corresponds substantially to the thermal expansion of said vapor-deposited metal layer.

13. An insulating glazing assembly comprising:

at least two mutually adjacent glass panes conjointly defining an interior space therebetween; and, a spacer disposed between said glass panes and said spacer including:

a plastic base body having two mutually parallel contact surfaces on opposite sides thereof in contact engagement with corresponding ones of said glass panes;

said base body being reinforced by glass fibers distributed in said plastic;

said base body also defining an adhesion surface facing away from said interior space and extending between said two glass panes;

a metal layer cemented to said adhesion surface; and said glass fibers being selected in amount such that the coefficient of thermal expansion of said base body corresponds substantially to the thermal expansion of said vapor-deposited metal layer.

14. An insulating glazing assembly comprising:

at least two mutually adjacent glass panes conjointly defining an interior space therebetween; and, a spacer disposed between said glass panes and said spacer including:

a base body made of plastic and having two mutually parallel extending contact surfaces on opposite sides thereof in contact engagement with corresponding ones of said glass panes;

said base body being reinforced by glass fibers distributed in said plastic;

said base body also defining an adhesion surface facing away from said interior space and connecting said two glass panes;

a vapor-deposited metal layer disposed on said adhesion surface; and said glass fibers being selected in amount such that the coefficient of thermal expansion of said base body corresponds substantially to the thermal expansion of said vapor-deposited metal layer.

* * * * *